United States Patent

Wang et al.

[11] Patent Number: 5,808,978
[45] Date of Patent: Sep. 15, 1998

[54] SPEED CONTROL OF OPTICAL INFORMATION REPRODUCTION APPARATUS

[75] Inventors: Wai William Wang; Meng-Shin Yen, both of Taoyuan, Taiwan

[73] Assignee: Acer Peripherals Inc., Taoyuan, Taiwan

[21] Appl. No.: 549,507

[22] Filed: Oct. 27, 1995

[51] Int. Cl.[6] .................................................. G11B 7/00
[52] U.S. Cl. ........................ 369/44.28; 369/54; 369/239
[58] Field of Search ............................. 369/44.27, 44.28, 369/43, 54, 50, 58, 239; 250/201.5

[56] References Cited

U.S. PATENT DOCUMENTS

| | | | |
|---|---|---|---|
| 4,485,337 | 11/1984 | Sandusky | 318/314 |
| 4,783,774 | 11/1988 | Enomoto | 369/50 |
| 4,884,259 | 11/1989 | Horikawa et al. | 369/44.26 X |
| 5,224,081 | 6/1993 | Muraoka et al. | 360/78.04 X |
| 5,246,479 | 9/1993 | Gami | 360/71 X |
| 5,289,097 | 2/1994 | Erickson | 318/561 |
| 5,345,347 | 9/1994 | Hopkins | 360/71 |
| 5,617,388 | 4/1997 | Ishioka et al. | 369/44.28 |

OTHER PUBLICATIONS

Compact Disc Digital Audio System Description—Sony Corp., N.V. Philips, Feb. 1985.

*Primary Examiner*—Aristotelis M. Psitos
*Assistant Examiner*—Alan Faber
*Attorney, Agent, or Firm*—Fish & Richardson P.C.

[57] ABSTRACT

A method for controlling speed of a spindle motor within a disk player is provided. The spindle motor drives a disk thereon and the disk player includes a pickup and a control circuit for performing focus and tracking operation of the pickup. The first step of method is to determine an allowable spin speed, Va, in accordance with a predetermined manner. The second step is to set speed of the spindle motor to operate at an allowable speed Va. The third step it to test if out-of-focus occurs during seeking of a particular track. If Yes in step 3, the fourth step is to re-focus the pickup. The fifth step is to set Va=Va− a predetermined decrement. The sixth step is to set speed of the spindle motor to operate at current Va decreased speed.

2 Claims, 4 Drawing Sheets

SPEED CONTROL OF OPTICAL INFORMATION REPRODUCTION APPARATUS

TECHNICAL FIELD OF INVENTION

The invention relates to an optical information reproduction apparatus and, in particular, the speed control of the optical information reproduction apparatus.

BACKGROUND OF INVENTION

Optical disk player such as digital audio-video disc player or information disc apparatus is basic component of the state-of-art multi-medium computer system.

The prior art control systems for the information disk apparatus known to the inventors of this invention includes the U. S. Pat. Nos. 4,485,337, 4,783,774, 5,289,097, 5,246,479 and 5,345,347.

The U.S. Pat. No. 4,485,337 discloses a servo data driven motor speed control. The disclosure uses the servo data present on all disk drives to provide an indication of rotational velocity. The circuit ordinary associated with the disk drive's servo system is utilized by the disclosure to recover the sync pulses present in each frame of servo data. The invention then couples the recovered sync pulses into the speed control circuit. The speed control circuit compares the frequency of the recovered sync pulses with the frequency of a reference oscillator. The result of the comparison is used to adjust the selection of a predetermined number of duty cycles of power application to the disk motor. The period of the duty cycle is determined by the frequency of the sync pulses.

The U.S. Pat. No. 4,783,774 discloses a control system for driving an optical information reproducing apparatus at a relatively low power consumption and a high power conversion efficiency. The disclosure employs a circuit for producing a response control signal and a drive circuit for applying the turntable motor or the pickup transfer motor with a power supply voltage which is changeable in response to the response control signal.

The U.S. Pat. No. 5,289,097 discloses a spindle control method and apparatus for disk drive. Responsive to detecting a start-up or an idle operation mode, a pulse width modulation mode control is applied to drive current to the spindle motor. Responsive to detecting one of the predetermined critical operations, a linear mode control is applied to drive current to the spindle motor. A small percentage of the overall file power-on time is spent performing critical file operations so that substantial power saving are achieved by the PWM mode control. The error rate reduction that results by operating in the linear mode during critical file operation is also advantageous.

The U.S. Pat. No. 5,246,479 discloses a drive motor controller for low power disk drive. The disclosure uses a switching regulator type DC/DC power converter to control spindle motor speed. In the switching regulator, a switching transistor is located near the ground side of the circuit so that a low resistance n-channel power MOSFET switching transistor is employed.

The U.S. Pat. No. 5,345,347 discloses a disk drive with several reduced power modes. The disclosure employs a control system which allows the disk drive to automatically enter and operate in reduced power modes when the drive is not actively reading or writing data in response to commands from the host computer. The power savings in these modes are achieved by selectively disabling certain electrical components of the disk drive. These electrical components include spindle controller, actuator controller and servo controller circuitry, which control operation of spindle motor, actuator motor, and read/write head positioning respectively. The controller circuits are in turn under the control of a drive microcontroller which is programmed to control entry and exit from the reduced power modes.

SUMMARY OF THE INVENTION

While the prior art control systems provide generally effective operation to meet the respective object of the invention, it is desirable to provide a method for, responsive to the eccentric index of the audio-video disk currently in the player, controlling the spindle motor speed of the audio-video disk player such that a possible increase of the access error rate or track-seeking time is avoided.

A method for controlling speed of a spindle motor within a disk player is provided. The spindle motor drives a disk thereon and the disk player includes a pickup and a control circuit for performing focus and tracking operation of the pickup.

In a first embodiment, the first step of method is to determine an allowable spin speed, Va, in accordance with a predetermined manner. The second step is to set speed of the spindle motor to operate at the allowable speed Va. The third step it to test if out-of-focus is happened during seeking of a particular track. If Yes in step 3, the fourth step is to re-focus the pickup. The fifth step is to set Va=Va– a predetermined decrement. The sixth step is to set speed of the spindle motor to operate at current Va.

In a second embodiment, the first step of method is to determine an allowable spin speed, Va, in accordance with a predetermined manner. The second step is to set speed of the spindle motor to operate at the allowable speed Va. The third step it to test if seeking time is greater than a predetermined value during seeking of a particular track. If Yes in step 3, the fourth step is to set Va=Va– a predetermined decrement. The fifth step is to set speed of the spindle motor to operate at current Va.

BRIEF DESCRIPTION OF APPENDED DRAWINGS

DETAILED DESCRIPTION OF THE PREFERRED EMBODIMENT

Figure 1:
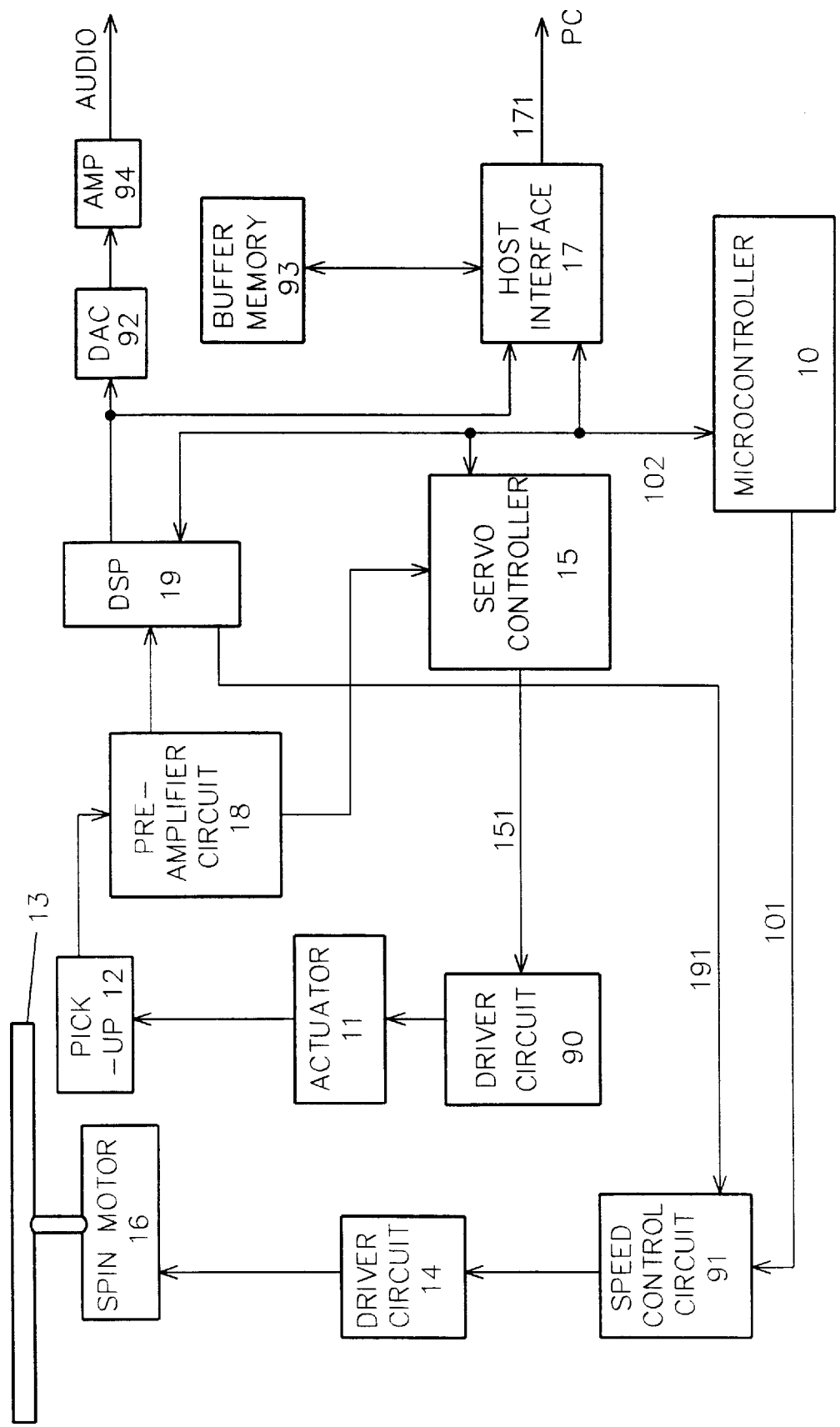
FIG. 1 shows mechanical and electrical components of a disk system in which the present invention may be employed.

Referring to FIG. 1, the mechanical and electrical components of a typical disk drive system includes a head/disk assembly (HDA) having therein an actuator 11, which preferably include a radial coil, a focus coil and an actuator motor, which positions the optical pickup 12 to different radial positions relative to the surface of disk 13. HDA also includes read preamplifier circuitry 18 for amplifying the data and servo information from the disk surface. The device 18 also contains a read buffer for supplying read data from the particular track selected for reading. The digital signal processor (DSP) 19 receives analog read data from circuitry 18 in the HDA. As well known in the arts, DSP 19 includes a read channel analog filter which supplies the analog signal to a pulse detector (not shown). The output of pulse detector is supplied to a data separator (not shown) as raw digital read data. The disk drive circuitry components, i.e. 15, 19, interface with a microcontroller 10 through a bus 102 which carries address, control and data information, as is well known in the art. The disk drive control circuit further includes a servo controller section 15 for detecting and processing servo information from disk 13 relating to servo bursts, sync pulses and track ID number indicating the radial position of optical pickup 12 relative to the disk surface. Servo controller section 42 connects to microcontroller 10 through bus 102 and operates to control the flow of information relating to servo read timing and control. Servo controller section 15 preferably includes servo controller, analog-to-digital (A/D) converter circuitry and digital-to-analog (D/A) circuitry. The analog output 151 from servo controller section 15 is supplied as an input to the actuator driver circuitry 90. Circuitry 90 includes power amplifier control circuitry which supplies an actuator drive signal to a power amplifier which in turn supplies control current to actuator 11 in HDA. The system shown also includes spindle motor control driver circuitry 14 for controlling the spindle drive motor 16 in HDA for rotating audio-video disk 13. The disk drive also includes a host interface 17 which operates to provide control and information paths between a host computer, through a bus 171 and the bus 102, and the associated elements shown. A buffer memory 93 is provided to accommodate differences in data transfer rate between the host interface 17 and host computer and that between the host interface 17 and drive. In other words, the buffer memory temporarily stores the video-audio information read from the disk 13. The DSP 19 also provides a feedback signal 191 into a digital motor speed control circuit 91 which compares the feedback signal 191 with a signal 101 from microcontroller 10. The result of comparison provides an indication of whether the motor is spinning too fast or too slow at the present time with regard to data transfer rate. The result of the comparison are used to control the motor driver 14, which provides power to the spindle motor 16.

Figure 2:
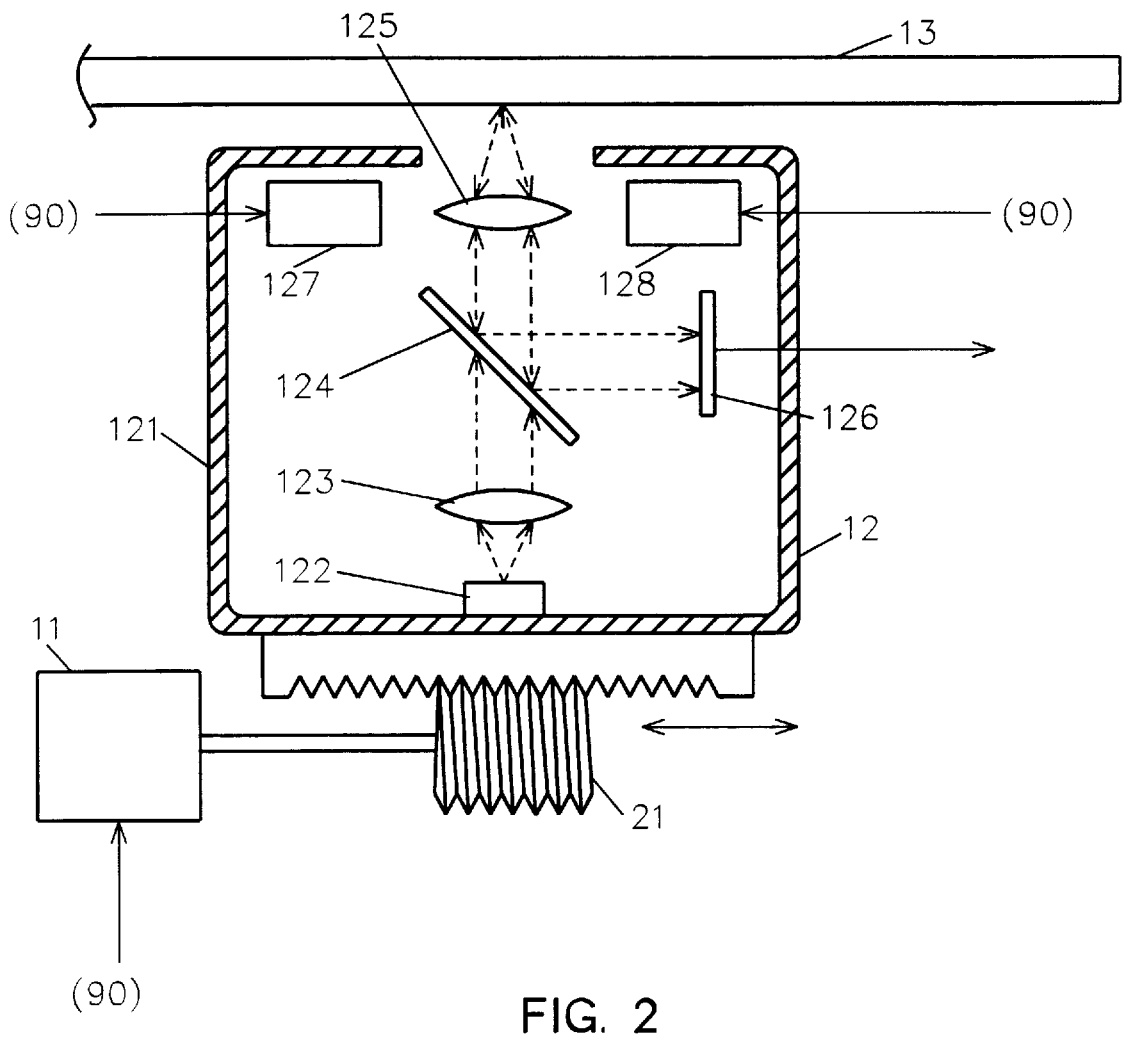
FIG. 2 shows a detail construction of a typical optical pickup.

Referring to FIG. 2, the optical pickup 12 is movably supported on a feeder 21. The feeder 21 is driven by the actuator 11 in a well known manner so that optical pickup 12. moves radially in reference to the surface of the optical disk 13. The optical pickup 12 comprises a carriage 121, a source of a light beam, e.g. a semiconductor laser device 122, a collimator lens 123, a semi-transparent mirror 124, a device for placing a laser beam on the optical disk 13, e.g., an objective lens 125, a split photosensor 126, a tracking actuator 127 and a focusing actuator 128. The laser device 122 radiates the laser beam. The collimator lens 123, the semi-transparent mirror 124 and the objective lens 125 guide the laser beam to the optical disk 13 so that the laser beam is placed on the optical disk 13 in a form of light spot. The optical pickup 12 then scans concentric tracks of the optical disk 13 one after another or a spiral track of the optical disk 13 with the light spot of the laser beam moving in radial direction during the disk information reproduction operation. The laser beam is reflected by the optical disk 13 and then applied to the split photosensor 126 through the objective lens 125 and the semi-transparent mirror 124. The split photosensor 126 detects from the reflected laser beam information data responding to a state, e.g., a strength of the reflected laser beam and produces an electrical signal responding to the information. The objective lens 125 is movably mounted on the carriage 121 of the optical pickup 12. The tracking actuator 127 controls a position of objective lens 125 in the radial direction of the disk 13 so that the light spot of the laser beam follows a center of a prescribed track. The tracking control of the objective lens 125 may be made by a conventional tracking control system. The focusing actuator 128 controls the position of objective lens 125 in the perpendicular direction to the surface of the optical disk 13 so that the light spot of the laser beam is accurately focused on a prescribed track. The focusing control of the objective lens 125 may be made by a conventional focusing control system.

Figure 3:
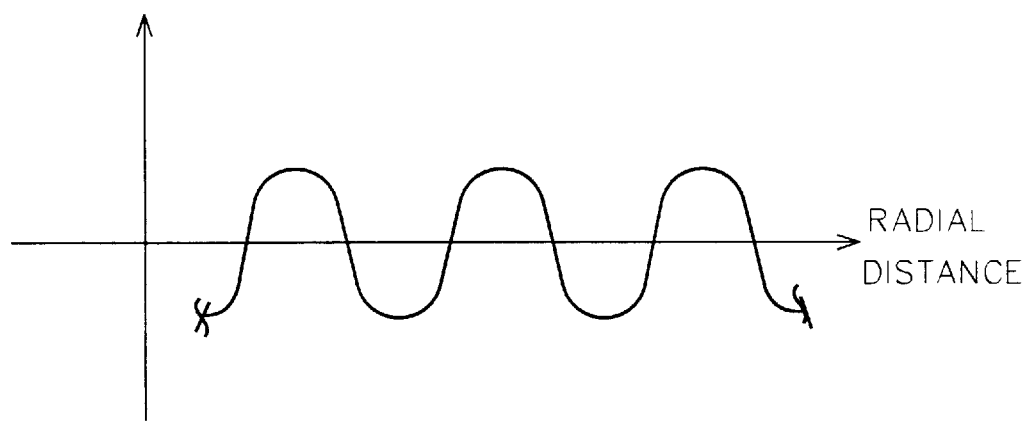
FIG. 3 shows the signal shape obtained as the optical pickup moves in radial direction of the disk.

FIG. 3 shows a typical signal shape obtained as the optical pickup 12 moves in radial direction with reference to the disk 13. It is readily known the number of track which the pickup traverses and the moving direction of the optical pickup 12 by counting the number of the complete cycle and by the phase change of the waveform obtained. In a typical disk, the distance between the consecutive track is 1.6 micron. Therefore, the distance of the pickup moves in data reproduction operation is readily obtained.

As the optical pickup 12 is kept steady and an eccentric disk 13 positioned in the drive is spinned, this eccentric disk produces a signal shape similar to that shown in FIG. 3. The eccentric index is equal to 1.6 micron multiplied with number of complete cycle obtained and divided by two.

Other than the eccentric problem mentioned above, defects such as the scratch existing on the surface of the disk, or the unbalance of mass distribution along the spin axis all results in a prolongation of the track seeking time and out-of-focus as the disk is operated at top speed.

Figure 4:
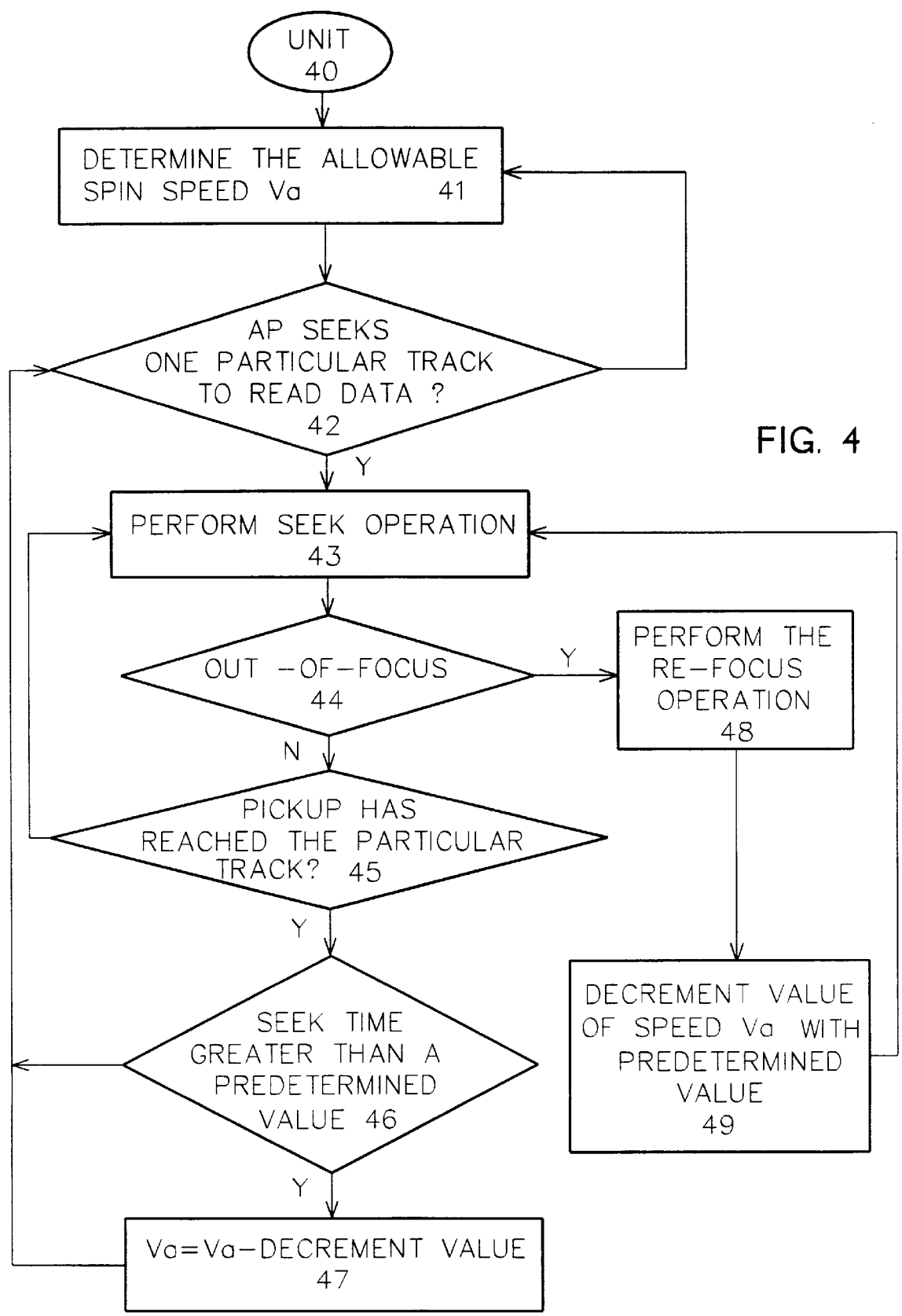
FIG. 4 shows the flow chart of the method of the present invention.

The flow chart of FIG. 4 discloses the steps of the invention. Step 40 is the initialization. In step 41, determine the allowable spin speed, Va, of the disk inserted in the player based on the eccentric index calculated in a way reiterated above which will be more clear with reference to the description regarding the flow chart of FIG. 5, and set the spin running at this allowable spin speed. In step 42, test if the application program seeks one particular track of the disk to read data. If Yes in step 42, in step 43, to perform the seek operation and thereafter, in step 44, test if out-of-focus is happened. If No in step 44, go to step 45. If Yes in step 44, in step 48, perform the re-focus operation and go to step 49. In step 45, test if the pickup has reached the particular track. If No in step 45, go back to step 43. If Yes in step 45, in step 46, test if the time used in completing the seeking operation is greater than a predetermined value. If yes in step 46, in step 47, set Va=Va-decrement value, wherein the decrement value may be a predetermined value such as one, and thereafter go back to step 42. If No in step 46, go back to step 42. In step 49, set Va=Vadecrement value, and thereafter go back to step 43.

Figure 5:
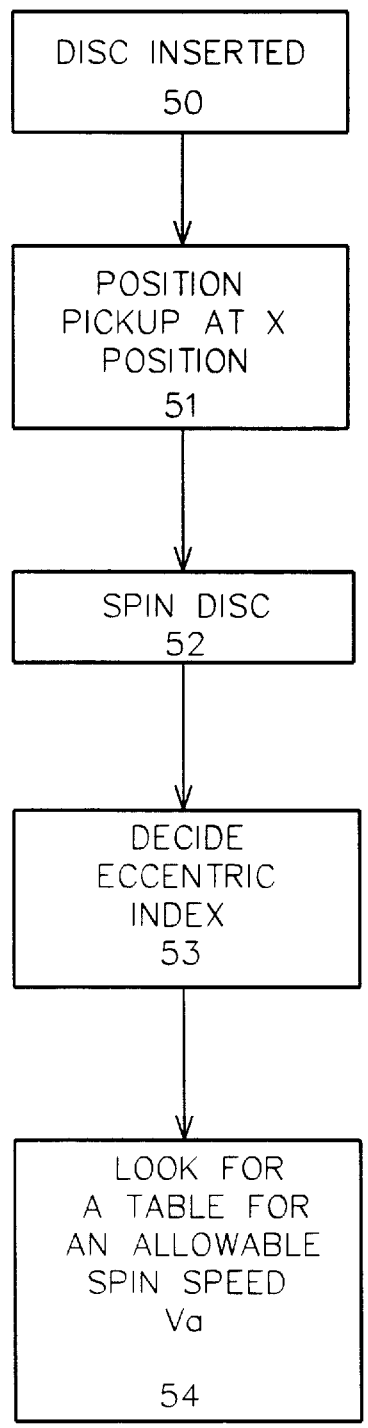
FIG. 5 shows the flow chart of method deciding the maximum spin speed of the spindle motor in light of the eccentric index of an audio-video disk presently in the player.

Referring to FIG. 5, in step 50, a disk 13 is inserted into the player. In step 51, position the pickup at a predetermined radial location relative to the disk 13. In step 52, spin the disk 13 at Nominal speed. In step 53, decide number of the track and the direction of eccentricity of the disk 13 to calculate the eccentric index. In step 54, based on the eccentric index obtained in step 53, look for a table stored in the microcontroller to find the allowable spin speed Va.

The followings recite the procedure by which the look-up table is built. First, prepare a plurality of testing disks each of which has a different predetermined eccentric index.

Second, insert disk of a predetermined eccentric index and run the disk player of one particular type at different spin speeds. This procedure results in an allowable spin speed, Va, of the player corresponding this eccentric index. Running over the allowable spin speed, phenomenon of either out-of-focus or seeking time being greater than a predetermined time occurs. The above procedure continues for disk of different eccentric index and a plurality of allowable spin speeds corresponding to different eccentric index respectively are obtained, which form the look-up table.

It is to be noted, all steps shown are performed within the microcontroller 10 in a manner well known in the art and, when either step 47 or 49 is performed, the microcontroller 10 sends a signal to speed control circuit 91 via signal line 101. The speed control circuit 91 then instructs the motor driver to slow down the rpm of the spindle motor 16 such that speed adjustment is completed.

We claim:

1. A method for controlling speed of a spindle motor within a disk player, the spindle motor driving a disk thereon and the disk player including a pickup and a control circuit for performing focus and tracking operation of the pickup, comprising the steps of:
    (1) determine an allowable spin speed in accordance with a predetermined manner;
    (2) set speed of the spindle motor to operate at a speed Va which is equal to said allowable speed;
    (3) test if out-of-focus occurs during seeking of a particular track;
    (4) if Yes in step 3 , re-focus the pickup;
        (i) decrease speed Va by a predetermined value to a decreased speed Vd;
        (ii) set speed of the spindle motor to operate at the decreased speed Vd;
    (5) if No in step (3), maintain value of speed Va of step (2).

2. for controlling speed of a spindle motor within a disk player, the spindle motor driving a disk thereon and the disk player including a pickup and a control circuit for performing focus and tracking operation of the pickup, comprising the steps of:
    (1) determine an allowable spin speed in accordance with a predetermined manner by:
        (i) positioning the pickup at a predetermined track of the disk;
        (ii) spinning the disk at a predetermined speed;
        (iii) deciding number of the tracks and direction of eccentricity of the disk for calculating an eccentric index corresponding to this disk;
        (iv) based on the eccentric index obtained in step (iii), look for a predetermined table to find the allowable spin speed;
    (2) set speed of the spindle motor to operate at a speed Va which is equal to said allowable speed;
    (3) test if out-of-focus occurs during seeking of a particular track;
    (4) if Yes in step 3 , re-focus the pickup;
    (5) decrement value of the speed Va by a predetermined value to a decreased speed Vd;
    (6) set speed of the spindle motor to operate at value of the decreased speed Vd.

* * * * *

UNITED STATES PATENT AND TRADEMARK OFFICE
CERTIFICATE OF CORRECTION

PATENT NO.   : 5,808,978
DATED        : September 15, 1998
INVENTOR(S)  : Wang et al.

It is certified that error appears in the above-identified patent and that said Letters Patent is hereby corrected as shown below:

<u>Column 6,</u>
First paragraph of Claim 2 should read:
-- A method for controlling speed of a spindle motor within a disk player, the spindle motor driving a disk thereon and the disk player including a pickup and a control circuit for performing focus and tracking operation of the pickup, comprising the steps of: --

Signed and Sealed this

Fourth Day of June, 2002

*Attest:*

*Attesting Officer*

JAMES E. ROGAN
*Director of the United States Patent and Trademark Office*